US012481174B2

(12) United States Patent
Cao

(10) Patent No.: US 12,481,174 B2
(45) Date of Patent: *Nov. 25, 2025

(54) ELECTRONIC LOUPE

(71) Applicant: CAO Group, Inc., West Jordan, UT (US)

(72) Inventor: Densen Cao, Sandy, UT (US)

(73) Assignee: CAO Group, Inc., West Jordan, UT (US)

( * ) Notice: Subject to any disclaimer, the term of this patent is extended or adjusted under 35 U.S.C. 154(b) by 131 days.

This patent is subject to a terminal disclaimer.

(21) Appl. No.: 18/362,919

(22) Filed: Jul. 31, 2023

(65) Prior Publication Data
US 2024/0022680 A1 Jan. 18, 2024

Related U.S. Application Data

(63) Continuation-in-part of application No. 17/425,298, filed as application No. PCT/US2020/015089 on Jan. 24, 2020, now abandoned.

(60) Provisional application No. 62/796,139, filed on Jan. 24, 2019.

(51) Int. Cl.
G02B 27/01 (2006.01)
G02B 27/02 (2006.01)
G02C 7/08 (2006.01)
G06F 1/16 (2006.01)
(Continued)

(52) U.S. Cl.
CPC ....... *G02B 27/017* (2013.01); *G02B 27/0172* (2013.01); *G02B 27/0176* (2013.01); *G02B 27/027* (2013.01); *G02C 7/081* (2013.01); *G02C 7/088* (2013.01); *G06F 1/163* (2013.01); *H04N 5/2628* (2013.01); *H04N 23/56* (2023.01); *G02B 2027/0138* (2013.01); *G02B 2027/014* (2013.01); *G02B 2027/0154* (2013.01); *G02B 2027/0178* (2013.01)

(58) Field of Classification Search
None
See application file for complete search history.

(56) References Cited

U.S. PATENT DOCUMENTS

2007/0064307 A1* 3/2007 Hluchan .................. G02C 7/12
351/158
2011/0145978 A1* 6/2011 Harbin ............... G02B 27/0176
2/209.13
2011/0306005 A1 12/2011 Jensen
(Continued)

FOREIGN PATENT DOCUMENTS

WO 2018/235088 A1 12/2018

Primary Examiner — Darryl J Collins
(74) Attorney, Agent, or Firm — Dobbin IP Law, P.C.; Geoffrey E. Dobbin

(57) ABSTRACT

An electronic loupe (400) features a view piece (401) mounted to a headpiece (405) by a linkage (406). A camera (402) and LED light (403) are mounted (404) in front of the view piece (401) to provide an image in the view piece (401) on displays (not shown) for the user. A control box (410) may be wired to the electronic loupe, or wirelessly connected, or the controls for the electronic loupe may reside on the view piece (401) and the headpiece (405). Other controls, such as a remote control or a foot pedal, are also disclosed. Illumination controls and location are designed for ideal illumination along various spectra. Automatic recording and documentation is also provided.

20 Claims, 8 Drawing Sheets

(51) Int. Cl.
  *H04N 5/262*  (2006.01)
  *H04N 23/56*  (2023.01)

(56) References Cited

U.S. PATENT DOCUMENTS

| | | |
|---|---|---|
| 2015/0123880 A1 | 5/2015 | Tam et al. |
| 2015/0138048 A1 | 5/2015 | Park |
| 2015/0293345 A1* | 10/2015 | Laxhuber ............... A61B 90/37 348/77 |
| 2016/0334644 A1 | 11/2016 | Garofolo et al. |
| 2017/0181802 A1 | 6/2017 | Sachs et al. |
| 2018/0303574 A1 | 10/2018 | Ramirez Luna et al. |
| 2020/0201082 A1* | 6/2020 | Carabin .................... A61C 5/00 |
| 2021/0038339 A1* | 2/2021 | Yu ........................ G02B 25/008 |
| 2022/0214552 A9* | 7/2022 | Koshiyama ............. A61B 17/42 |

\* cited by examiner

ELECTRONIC LOUPE

CROSS-REFERENCES TO RELATED APPLICATIONS

This application claims priority as a continuation-in-part of prior filed U.S. application Ser. No. 17/425,298, filed Jul. 22, 2021, which is in turn a 371 national phase entry of prior filed PCT/US20/15089, filed Jan. 24, 2020, which claims priority to prior filed U.S. provisional application No. 62/796,139, filed Jan. 24, 2019, and incorporates the same by reference herein in their entirety.

TECHNICAL FIELD OF THE INVENTION

The present invention relates to electronic loupes for use in medical, dental, veterinary, laboratory, industrial, and any fields that need magnifications, illumination, and documentation for observed objects.

BACKGROUND ART

An optical loupe using a magnifying lens or lens system is a common device worn by user in front of their eyes to magnify the observed objects. The optical loupes already on the market are in various shapes and mechanical designs. These optical loupes have a first, single, configuration for single eye use and another, double, configuration for both eyes. The optical loupes have been used in many fields including, not limited to the medical, dental, veterinary, manufacturing, inspection, and many other sectors. The following features are almost universally desired by users: high magnification, high resolution, low weight, variable working distance, ease of use, recording and broadcasting capability, remote viewing, and other desired functions.

The key challenge for an optical loupe is that higher magnification requires using an optical lens system. However, such systems combine multiple optical lenses due to the limitation of physics, yielding a larger size. The larger size resulting from the requirement of higher magnification also creates an optical loupe that is heavier. The combination of larger size and greater weight makes the usage of an optical loupe difficult and inconvenient when better resolution is required. This physical limitation is why current optical loupes have a common magnification range of 2 to 5 times. For higher magnification, the optical lens will be large, and the entire system will be very heavy. In the specialty fields, like medical and dental fields, the double configuration optical loupes also must be customized to fit human eye pupil distance and eye vision. This is inconvenient for many customers. The optical loupes in the prior art also cannot record an observed event and other functions that users desire to have. Currently, higher magnification is accomplished by separate microscope setup which occupies a lot of space. Furthermore, illumination or lighting for an observed object is also important to see objects under magnification. Such light may be beyond the visible spectrum, such as in the IR or UV ranges. Having a light source that is always aligned with observed object is highly desirable but requires utmost care in setting the system up. Currently viewing, magnification, and lighting systems are set up separately and are not synchronized together.

Documentation on command is also important for different procedures. Having the events documented in real time and stored in either local device or in cloud storage is beneficial for user, patients, or third parties when the document is needed for different purposes.

This invention is to use a video camera and a lens system as an observation outlet to view targeted objects. Mechanics, optics, electronics, and software are used to magnify the objects, and small size displays are used to display captured objects in front of the eyes. This device can achieve all the desired features of a loupe for users: high magnification, good resolution, convenient to use, variable working distance, recording the event, storing the desired event, review stored or remotely stored records, share the event, superior ergonomics (particularly for the head, neck, and upper back), and many other benefits.

DISCLOSURE OF THE INVENTION

In view of the foregoing disadvantages inherent in the known types of loupes, an improved electronic loupe that at least meets the following objectives: it is lightweight, easy to use, and provides greater magnification than currently possible with optical loupes as such, a new and improved electronic loupe may comprise systems to vary type and intensity of illumination and to automatically document a procedure in order to accomplish these objectives.

The more notable features of the invention have thus been outlined in order that the more detailed description that follows may be better understood and in order that the present contribution to the art may be better appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in several ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions as far as they do not depart from the spirit and scope of the present invention.

BRIEF DESCRIPTION OF THE DRAWINGS

In order to describe the manner in which the above-recited and other advantages and features of the invention can be obtained, a more particular description of the invention briefly described above will be rendered by reference to specific example embodiments thereof which are illustrated in the appended drawings. Understanding that these drawings depict only typical, though preferred, embodiments of the invention and are not therefore to be considered to be limiting of its scope, the invention will be described and explained with additional specificity and detail through the use of the accompanying drawings.

BEST MODES FOR CARRYING OUT THE INVENTION

With reference now to the drawings, preferred embodiments of the electronic are herein described. It should be noted that the articles "a," "an," and "the," as used in this specification, include plural referents unless the content clearly dictates otherwise.

Figure 1:
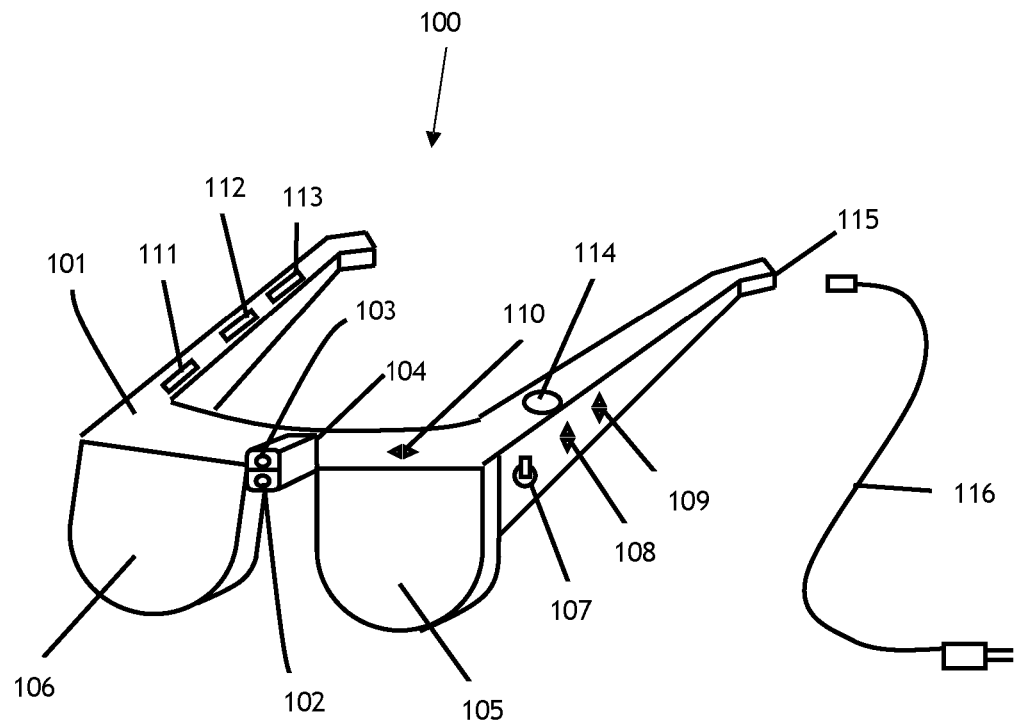
FIG. 1 depicts one embodiment of electronic loupe according to a first embodiment of the present invention.
Figure 1:
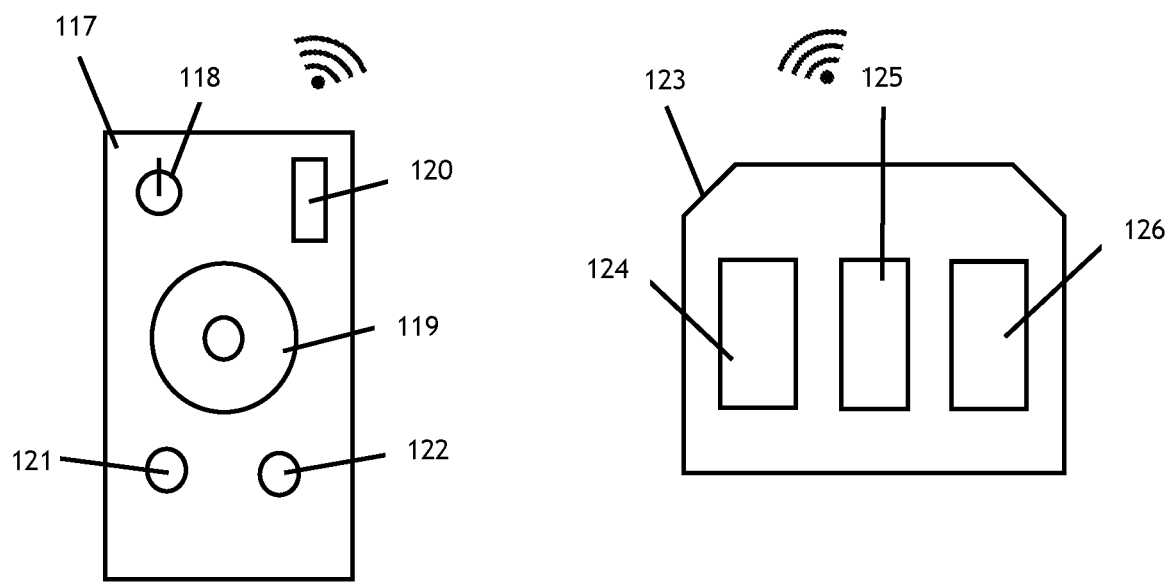

FIG. 1 depicts one embodiment of electronic loupe (100) with a frame (101). The frame (101) includes all the components that are needed for the loupe. A battery, electronic control circuit, view windows, wireless communication tool, storage media, and others which are not shown in the figure are inside the arms of the frame (101). A video camera (102) may have an optional optical lens in front of the camera. The video camera (102) and lens can be automatically zoomed and focused on observed objects. The video camera (102) can be CCD or CMOS or Micro LED or any other type of digital camera. Video camera (102) may also be a plurality of cameras. The resolution of the video camera (102) shall be as high as possible based on available technologies. An LED light source (103) may be provided for illumination. The light color temperature from LED light source (103) may be ranged from 2700K to 9000K depending on the needs. The color rendering index (CRI) should be 80 or higher. Light source (103) shall generate a light spot that is of a size that the application needs. The camera (102) and LED light source (103) can be in one body or separate bodies. There may be a mounting structure (104) for video camera (102) and light (103) to be attached to the center position of the frame (101) as illustrated. However, the light (103) and camera (102) can be attached to any position of the frame (101). The mounting structure (104) may include a lever, dial, or other control to adjust the camera (102) and light (103) towards desired directions (such as towards a given target) and in multiple directions. Adjustment may be accomplished individually or with the camera (102) and light (103) together as a unit. The camera (102) and light (103) can also be detached from main frame (101) with extra wire connection so that camera (102) and light (103) can reach to a desired surface for closer look of said surface. This light source (103) may also be mounted directly on or as a part of the camera body so as to maintain perfect alignment to the camera lens.

Viewing windows (105), (106) are provided so the user may see either video or image. The view windows (105), (106) can be semi-transparent or transparent screens. Details of view windows will be described in a later section. The displays in the view windows (105), (106) are preferred to be as high resolution as technologically available. The display windows (105) and (106) may be hinged so that they may be selectively flipped up to give the user a normal view of surroundings.

Other controls are provided for various functions. Power switch (107) is provided to turn the unit on and off, while adjustment buttons (108), (109) control the intensity of the LED light source and contrast of the display. The camera can be used with or without the LED light. Magnification is controlled with another button or button set (110). The user may record what is viewed by activating a control button (111) while an inlet/outlet (112) for an external storage, which could include cloud storage, a connected local device, or a remote system for third party use. External viewing may be enabled by providing a port (113) to export the viewed event to external terminals for third party viewing using a cable. The video signal can also be exported through a wireless manner like Wi-Fi, Bluetooth, and others to another view screen or glasses. There will be a graphic user interface ("GUI"), such as one shown in FIG. 8, in the displays (105), (106) to guide user for control and status of the functions of the device. At least one navigation button (114) for navigating the graphic interface on the display is provided to control various functions of the device. Charging may be accomplished through a simple inlet (115) and power supply (116).

All the control functions can be displayed in the display windows (105), (106) in the user graphic interface and all the controls described above can also be achieved through a voice control technology to activate the function buttons as needed. User can simply say the commands to activate the desired function.

All the control functions can be displayed in the display window in the graphic interface and all the controls described above can also be achieved a remote control. The remote control can be operated by hand or voice. A remote control (117) may also be provided. The remote control (117) transmits signal through wireless means to the main unit. There is a power button (118) to turn on and turn off the device. There is a navigation button (119) to go through the graphic interface for selection of the functions displayed in the view window. There is a zoom button (120) to select the desired magnification. In the preferred embodiment, there is a video recording button (121) to record the event. A still picture taking button (122) may also be included. There may be other buttons for quick action to be added to the remote as needed.

All the key controls may also be controlled by a wireless footswitch pad (123) for straightforward operation if the operator's hands are occupied during the use. One or more switches may be included on the wireless footswitch pad (123) such as switch (124) for video recording the event, switch (125) magnification control, and switch (126) for taking still pictures. There may be other switches for other quick actions, such as focus adjustment or to adjust light intensity, added to the main body of either the footswitch pad (123) or the remote control (117).

Figure 2:
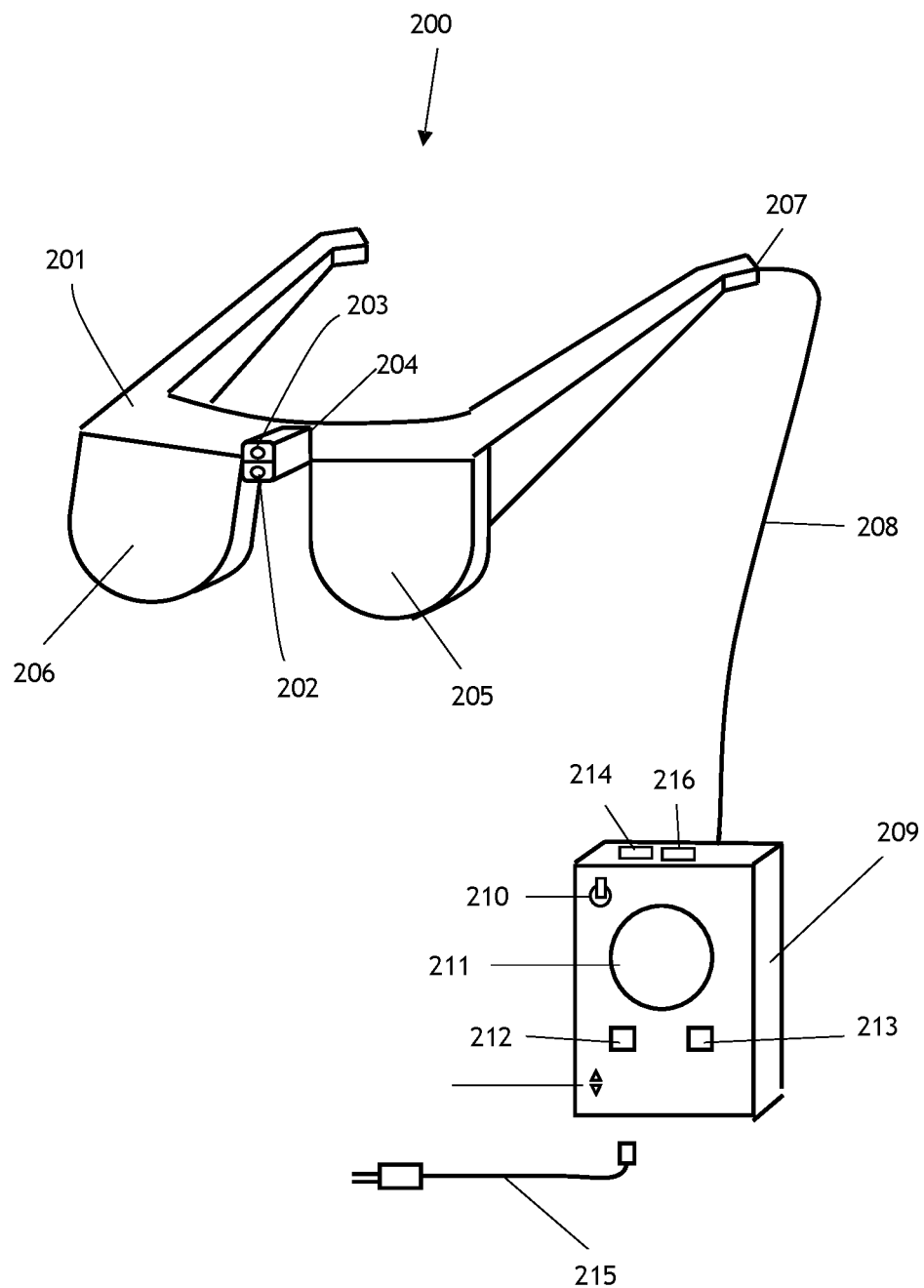
FIG. 2 depicts another embodiment of electronic loupe according to a second embodiment of the present invention.

FIG. 2 depicts another embodiment of electronic loupe (200) with wired control and power supply. Like in the first embodiment, the frame (201) includes all the components that are needed for the loupe (200). Video camera (202) and LED light source (203) for illumination of the object are provided for a clear image. Video camera (202) and light (203) can be in one body or separate body depending on the requirements. The light color temperature may be ranged from 2700K to 9000K depending on the needs. The color rendering index (CRI) should be 80 or higher. The camera (202) can be used with or without LED light (203). Fixture (204) is used to attach video camera (202) and light (203) to frame (201). The mounting structure (204) can make the camera (202) and light (203) adjustable to desired directions. The camera (202) and light (203) can also be detached from main frame with extra wire connection so that camera and light can reach to desired surface for close look of the surface. Viewing windows (205) and (206) are for video and image. Details of view windows (205) and (206) will be described in a later section. The displays are preferred to have high resolution. A control box (209) is connected by a cable (208) into port (207), connecting frame of the loupe to control box (209). Control box (209) contains a rechargeable battery and electronic control circuits which are not displayed in the figure. Power is activated by power switch (210). A navigation button (211) to reach to different commands in the goggle display is provided. Such a button may be a simple rotate-and-press type, or any other type now known or later discovered that will allow navigation of the graphical user interface. Control buttons (212), (213) are provided to work with navigation button for control and for recording. An external storage disk inlet (214) is also provided. Power supply (215) is set to connect to control box (208) to charge the battery. The video signal can be exported through a connection port (216) or wireless manner like Bluetooth to another view screen or glasses. This embodiment will make the main frame light in weight. The features of the components in this embodiment shall be the same as these described in FIG. 1. This embodiment can also be controlled by voice, remote control, and wireless footswitch as described in FIG. 1.

Figure 3:
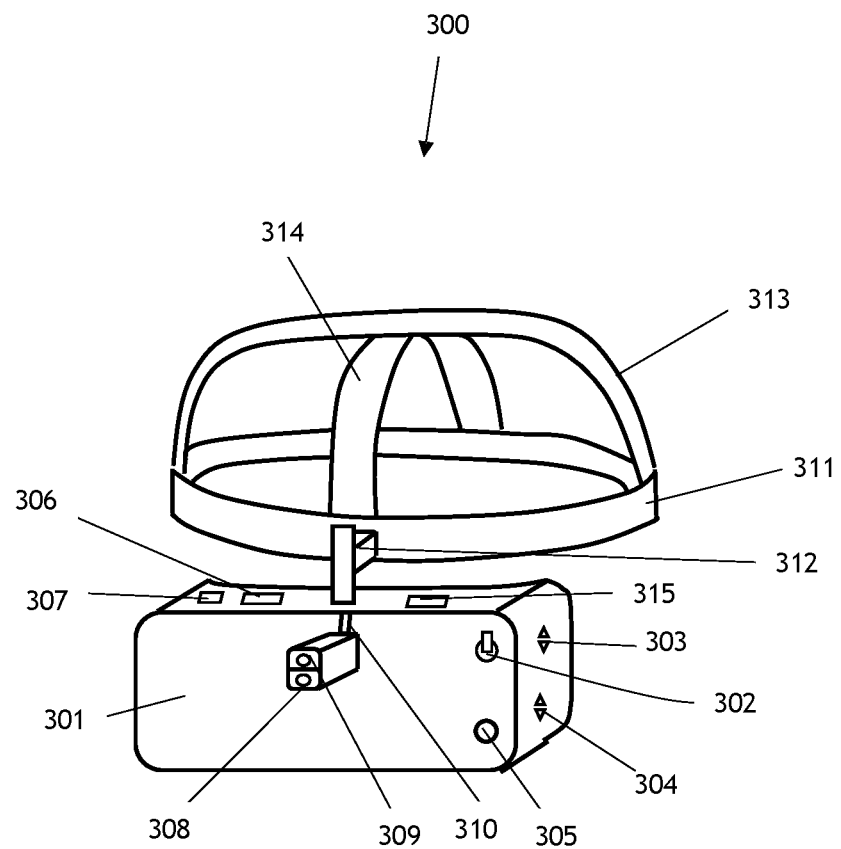
FIG. 3 depicts another embodiment of electronic loupe according to a third embodiment of the present invention.

FIG. 3 depicts another wireless embodiment of invented electronic loupe (300). A view piece, or goggle, (301) contains electronic control, optics, display, battery, storage disk, export port, and others inside the body (301). On the view piece box (301), there is a main power switch (302). A light intensity adjustment (303) and an image contrast and brightness adjustment (304) are also provided. A recording or picture taking button (305) may also be provided. A slot for external storage disk (306) and a charging input (307) may also be provided. A video camera (308) and an LED light source (309) can be in one body or separate bodies depending on needs. The camera (308) and light (309) are attached to view piece (301) using structure (310). The structure (310) can adjust the camera (308) and light (309) to any desired direction. The camera (308) and light (309) can also be detached from the view piece with extended wire for a close up look of designed object. The camera can be used with or without LED light. The view piece (301) is attached to head band (311) using adjustment structure (312). The adjustment structure (312) can adjust the view piece horizontally and vertically to make the view piece fit human face anatomy to have a clear view of images. The adjustment structure (312) can also flip the view piece to from eyes to see normal physical space. The head band can have a cross bands (313) and (314) to secure overall head band to user's head tightly and stably. The battery to operate the unit can be inside main body 301 or separate body attachment in any position of head band, preferred position is opposite position of main body. The video signal can be exported through a connection port (315) or wireless manner like Bluetooth to another view screen or glasses. This embodiment will make the wearing of the device better positioned and hold on to the user's head. The features of the components in this embodiment shall be the same as these described in FIG. 1. This embodiment can also be controlled by voice, remote control, and wireless footswitch as described in FIG. 1.

Figure 4:
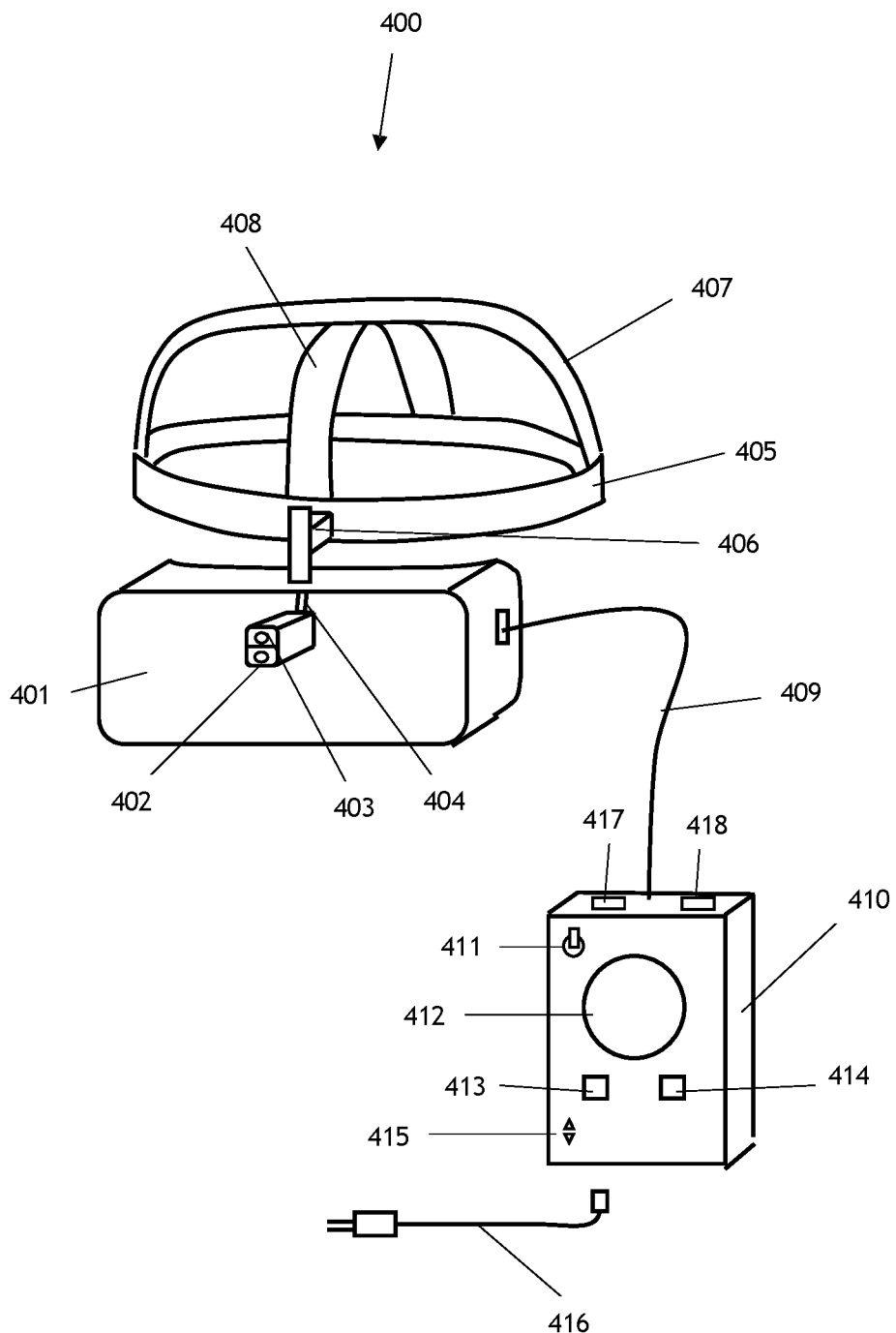
FIG. 4 depicts another embodiment of electronic loupe according to a fourth embodiment of the present invention.

FIG. 4 depicts another wired embodiment of the invented electronic loupe (400). Like the previous embodiment (401) is a view piece which contains electronic control, optics, display, and others inside the body). A video camera (402) and a LED light source (403) are attached to view piece using structure (404). The camera (402) and LED light source (403) can be in one body or separate bodies depending on needs. The structure (404) can adjust camera (403), (404) to any desired direction. The camera (403) and light (404) can also be detached from view piece with extended wire for a close-up look of designed object. The camera (403) can be used with or without LED light (404). The view piece (401) is attached to a head band (405) using adjustment structure (406). The adjustment structure (406) can adjust the view piece horizontally and vertically to make the view piece fit human face anatomy to have a clear view of images. The adjustment structure (406) can also flip the view piece to from eyes to see normal physical space. The hand band can have a cross bands (407) and (408) to secure overall head band to the head tightly. The head band can be adjusted to fit varied sizes of head. A cable (409) connects view piece (401) with a control box (410), containing a rechargeable battery and electronic control circuits which are not displayed in the figure. Power switch (411) to turn the unit on and off is also provided. Like in the previous embodiment, (412) is a navigation button to reach to different commands in the goggle display while (413) is a control button to work with navigation button for control. Recording control (414) and an inlet for an external storage disk (415) are also provided. Cord (416) is a charging power supply set to connect to control box (410) to charging battery through port (417). The video signal can be exported through a connection port (418) or wireless manner like Bluetooth to another view screen or glasses. This embodiment will make the wear of device better positioned and hold in user's head with lighter weight. The features of the components in this embodiment shall be the same as these described in FIG. 1. This embodiment can also be controlled by voice, remote control, and wireless footswitch as described in FIG. 1. For embodiments described in FIGS. 3 and 4, the battery and other components can also be positioned on opposite side of head band to balance the overall weight of the unit.

Figure 5:
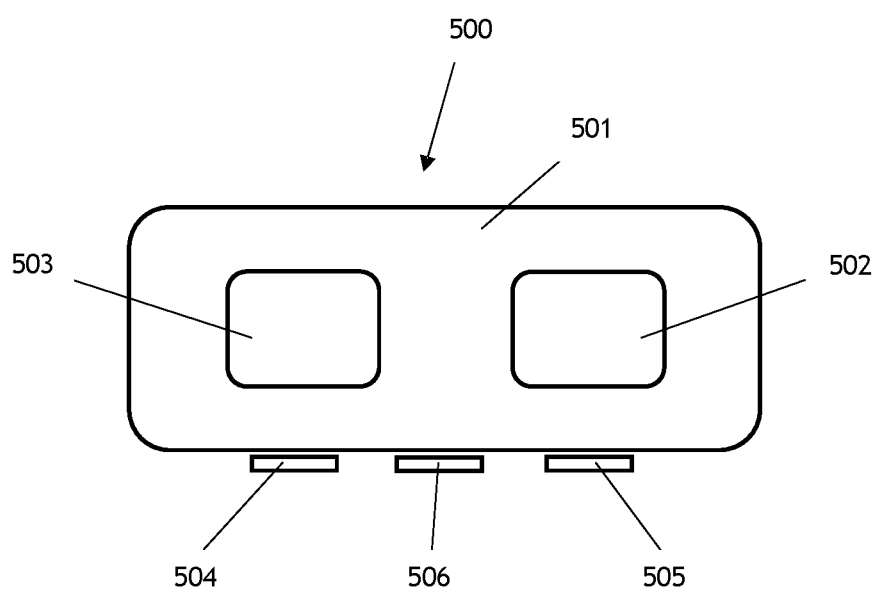
FIG. 5 depicts the eye view adjustment of an electronic loupe according to an embodiment of the present invention.

FIG. 5 depicts eye view adjustment (500) of a view piece, similar to that shown in FIGS. 3 and 4. As can be seen in the side of the view piece facing the user, (501) is the view piece while (502) and (503) are the view windows for eyes, respectively. By operating a control structure, such as a lever, dial, or an electronic control for a servo unit, the view windows can be adjusted for pupil distance and focus distance for eye vision. View windows may also be adjusted individually, as is shown in FIG. 5 where buttons (504), (505) are provided to adjust the left view and right view windows. Such adjustment allows the user to position view windows to fit different persons' eye requirements for viewing objects. The focus of the display may also be adjusted through a button (506). The image quality can be adjusted through different control buttons in either view piece or control box. The eye vision can also be adjusted by inserting prescribed eyeglasses between view windows and eyes. A setup of a micro display can be displayed as a view window. It should be noted that when micro displays are used, pupil and focus adjustment is needed.

Figure 6:
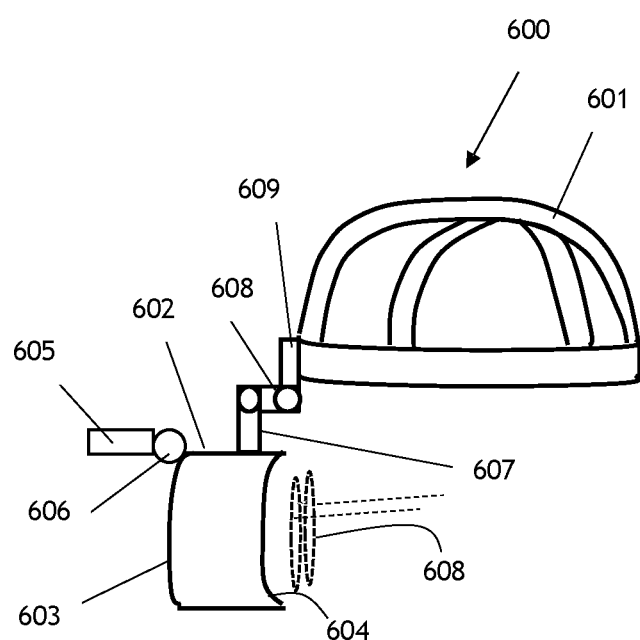
FIG. 6 depicts a side view of an electronic loupe, as shown in FIG. 4 or 5.

FIG. 6 depicts a side view of one embodiment of electronic loupe (600). Head band (601) is adjustable to fit to a human head while (602) is a view piece with a front side (603) and back side (604). The back side (604) faces the human face and is aligned with eyes. A view piece (602) also contains a video camera and light (605), attached by structure (606). The structure (606) can be adjusted in different directions to position the camera and light (605) as desired. A leveler (607) may attach to view piece (602) in one end and subsequently attached to a second leveler (608) by its other end. The attachment between (607) and (608) shall have following mechanical functions: being able to swing eye view piece (602) at least 90 degrees from eye level; and move the eye piece back and forth in relative to horizontal level of leveler piece (608). Leveler (608) may be attached to a third leveler (609). Leveler (608) should move up and down along the third leveler (609). Such a mechanism will be enabled to level the loupe 600 with the human eye.

Figure 7:
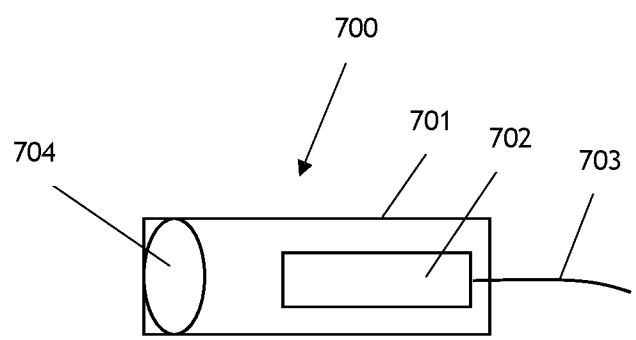
FIG. 7 depicts a camera setup according to an embodiment of the present invention.

FIG. 7 depicts camera setup (700). Housing (701) contains video camera (702) while (703) is the electrical cable to provide power and receive signals from video camera. Camera (702) is behind a lens system (704) for enabling camera (702) to focus for a variable working distance, and for magnification. The magnification of the lens can be 2× or higher. The preferred choice is the lens can be changed from 1× to different magnification. This setup will help the magnification of the initial image. The image then can be magnified using digital software to enlarge for desired magnification without losing resolution.

Figure 8:
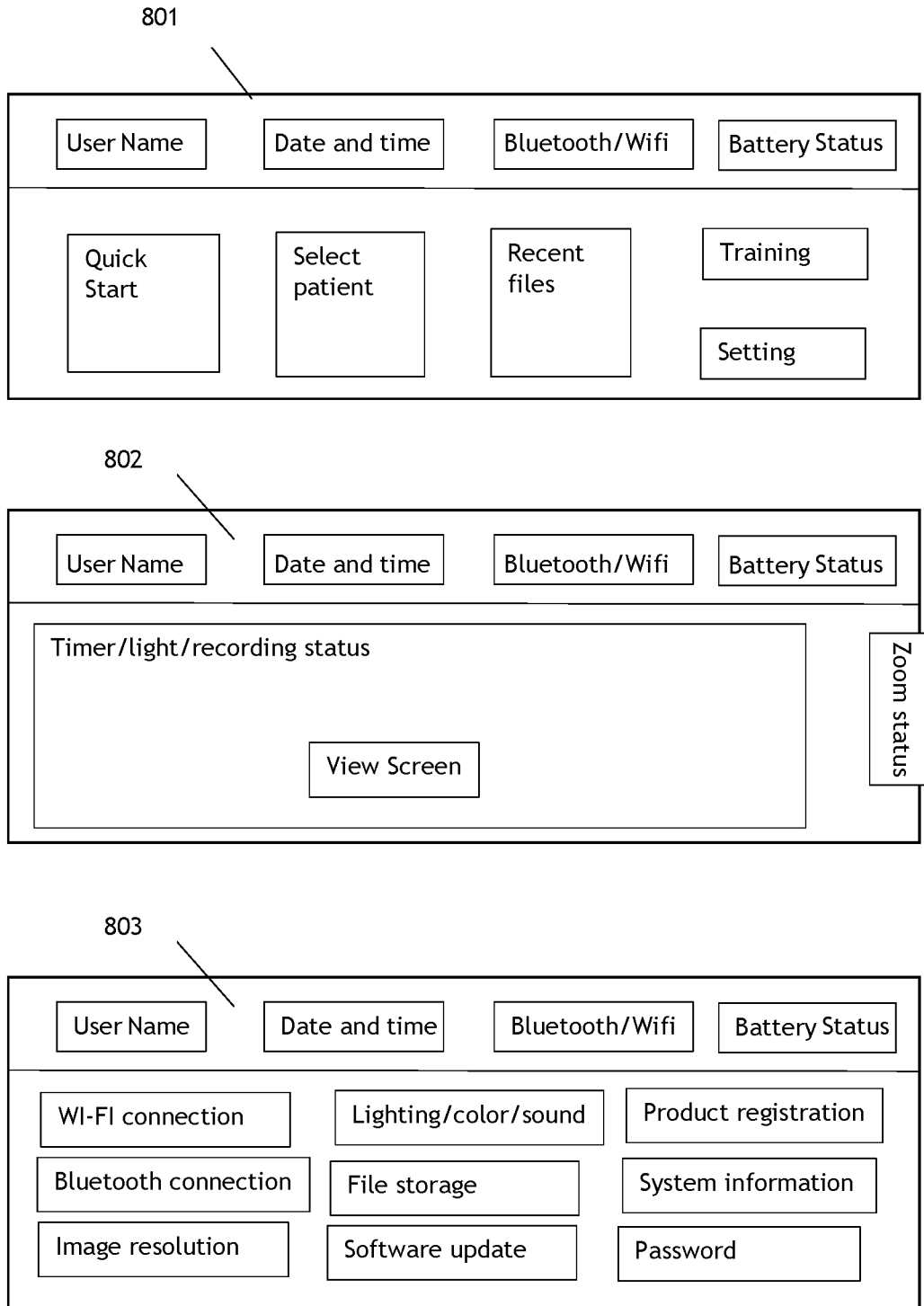
FIG. 8 depicts a basic layout for a graphic user interface.

FIG. 8 illustrates a basic graphic user interface for the device. Interface (801) is what user will see when the unit starts. The top bar will have indicators for username, date and time, blue tooth or wi-fi connection status, and battery status. There are several buttons for user to select including setting, training, quick start, select patient records, and recent files. Interface (802) is when the unit is in operation to observe the subject. The interface (802) includes the top view bar, a view screen with indication timer, lighting status, and recording status. A side bar may indicate the zoom status. Interface (803) is for setting of the unit including wi-fi or blue tooth connection, image resolution, lighting/color/sound control, file storage software update, production registration, system information and password setting. Interfaces (801), (802), and (803) are basic settings for user interface and can have any desired function control buttons as user desires. These displays, including the in-use display (802) and interface (803), may be displayed on either a main control unit or may be displayed as a GUI on the view screens (502), (503).

The device is using a software operating system to control the operations. The operating system can be Linux, ISO, Windows, and others. The operating system will manage the settings like language, dates, locations, Wi-Fi connection, Bluetooth connection, and others, wireless transmission and controls, connection with other applications and libraries, browsing contents on the device or cloud storage, update the software and applications. The operation system is also able to do image processing, data analysis, artificial intelligence, and many other functions as needed.

The method for use is as follows. The user wears the loupe on head, turns on the power, positions the digital cameras to designed position, turns on the LED light source as needed for illumination, adjusts the contrast of the display, adjusts magnification as needed, and records the event as needed. User can use voice control, remote control, or wireless footswitch control to control functions of the device. The recorded event can be stored in the disk inside the frame or an external storage disk or in the cloud storage or external terminal for broadcasting. The observed event can be displayed through other display devices for third party review via wi-fi, blue tooth, or wired connection.

The display can show necessary information about the loupe. Information can be displayed, not limited to, followings: magnification, battery status, dates, and recording status.

The magnification of image in the electronic loupe will be the combination of the optical lens and the provided digital zoom technology. There are many advanced zoom technologies available in the market. High density CCD or CMOS to create an image with 20 megapixels is readily available. Using these imaging devices, a magnification of 10× or higher can be achieved digitally with quality. It is preferred to have CCD or CMOS sensors to create image with as high-resolution density as possible, at least 5 megapixels. The electronics and software to achieve digital zoom will be developed based on current, and future, available technology.

The view display can be LCD, OLED, micro-LED, or any type of display. The resolution on the display should be above 680×480 pixels with higher resolutions preferred.

Although the present invention has been described with reference to preferred embodiments, numerous modifications and variations can be made and still the result will come within the scope of the invention. No limitation with respect to the specific embodiments disclosed herein is intended or should be inferred. The term "headpiece" as used in the claims shall include both the frames of the first two embodiments and the headbands of the other disclosed embodiments.

INDUSTRIAL APPLICABILITY

The present invention has industrial applicability in that it may be produced by industry and has usefulness in the medical, dental, optical, and other fields.

What is claimed is:
1. An electronic loupe comprising
a headpiece supporting at least one digital camera with optical zoom capability;
a viewing structure, on which an image taken by the camera is displayed mounted upon a linkage, the linkage further comprising:
a first leveler attached between the viewing structure and a second leveler,
the second leveler being attached to a third leveler, and slidable vertically along a length thereof; and
the first leveler hinged slidable forward and rearward along a length of the second leveler as defined by a connection between the second and third levelers;
wherein the third leveler is also operatively coupled to a headpiece;
a set of controls for the electronic loupe;
a graphic user interface displayed in the viewing structure;
a control system, said control system having the capability of producing a digital zoom of the image; and
a power source;
wherein a headpiece is worn, and the viewing structure provides imagery of a targeted area at a higher magnification for a user.
2. The electronic loupe of claim 1, at least a portion of the set of controls residing on the headpiece.
3. The electronic loupe of claim 1, at least a portion of the set of controls residing on a remote control.
4. The electronic loupe of claim 1, at least a portion of the set of controls residing on a wireless foot switch.

5. The electronic loupe of claim 1, at least a portion of the set of controls residing on a control unit in wired communication with the viewing structure.

6. The electronic loupe of claim 1, the headpiece being a frame and the viewing structure being at least one screen mounted to the frame.

7. The electronic loupe of claim 1, the headpiece being a frame and the viewing structure being two display screens mounted to the frame.

8. The electronic loupe of claim 1, the viewing structure being hinged to pivot upwards.

9. The electronic loups of claim 1, the headpiece being a head-band and the viewing structure mounted thereon presents two viewscreens.

10. The electronic loupe of claim 1, further comprising a light source for illumination of a desired area for the at least one digital camera.

11. The electronic loupe of claim 10, the light source and at least one digital camera being supported by a single body and are fixedly aligned such that the light source and camera are both directed towards a target.

12. The electronic loupe of claim 1, the at least one digital camera being movable in relation to the electronic loupe.

13. The electronic loupe of claim 1, the at least one digital camera being paired with at least one lens.

14. The electronic loupe of claim 1, the power source being a rechargeable battery.

15. The electronic loupe of claim 1, further comprising at least one leveling linkage between the headpiece and the viewing structure.

16. The electronic loupe of claim 1, further comprising an export system whereby images may be exported to a display outside of the electronic loupe.

17. The electronic loupe of claim 1, further comprising a storage medium.

18. The electronic loupe of claim 1, further comprising wireless communication technology.

19. The electronic loupe of claim 1, the viewing structure being adjustable to accommodate distances selected from the set of distances consisting of: pupillary distance and focus distance.

20. The electronic loupe of claim 1, the viewing structure being adjustable to accommodate eyeglasses.

* * * * *